United States Patent Office 3,520,552
Patented July 14, 1970

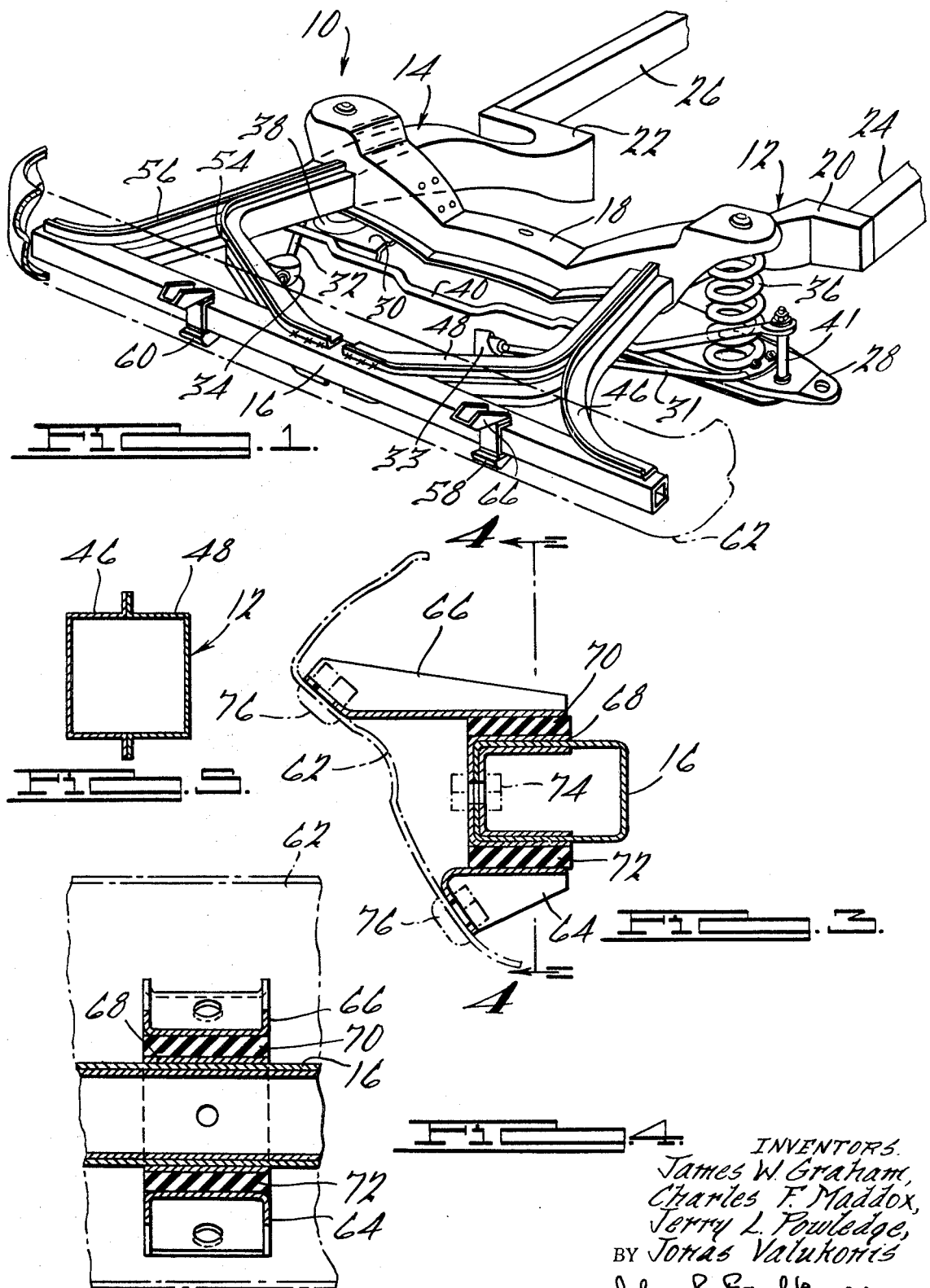

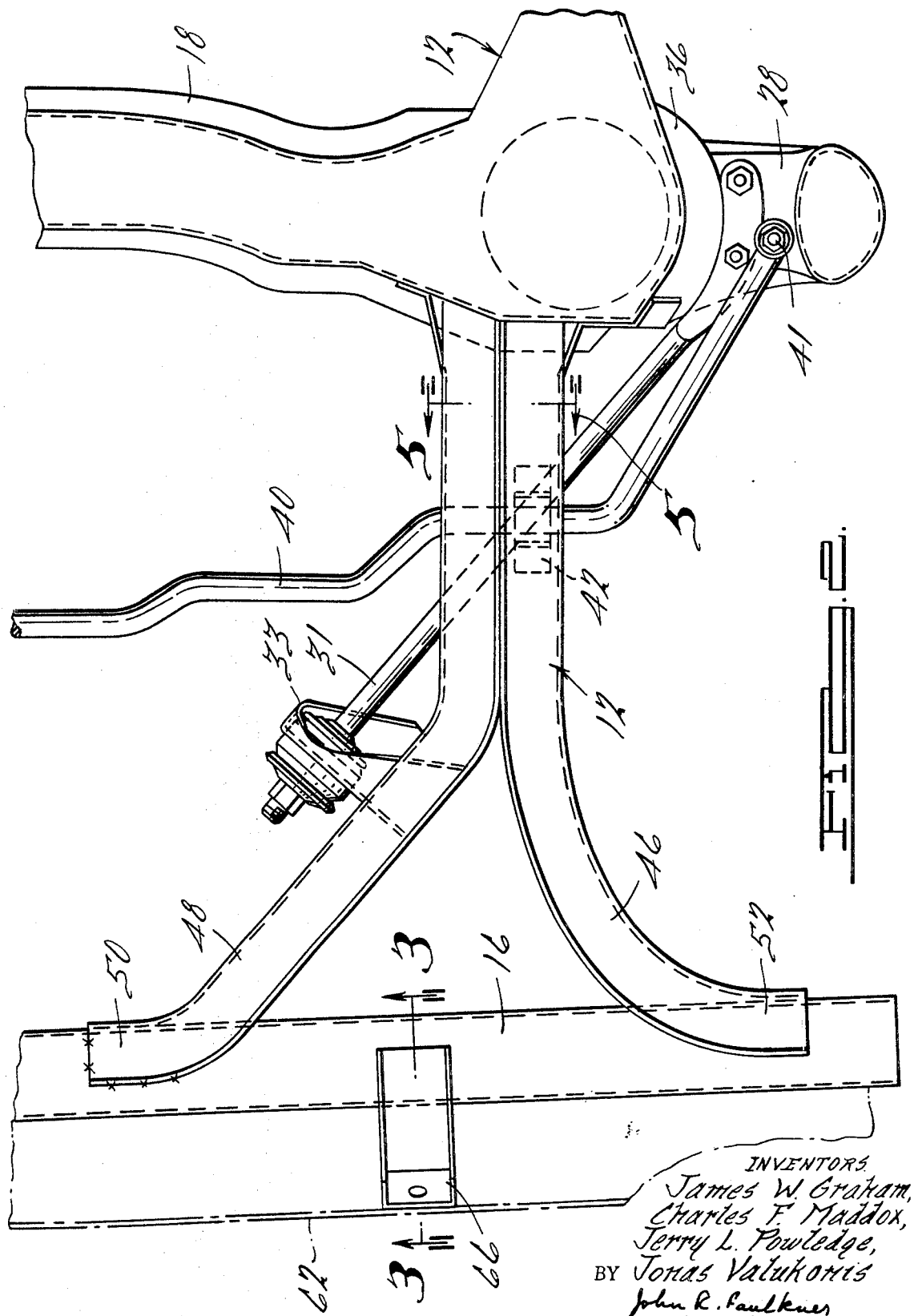

3,520,552
FRAME STRUCTURE FOR A MOTOR VEHICLE
James W. Graham, Detroit, Charles F. Maddox, Livonia, Jerry L. Powledge, Southfield, and Jonas Valukonis, Detroit, Mich., assignors to Ford Motor Company, Dearborn, Mich., a corporation of Delaware
Filed Feb. 21, 1968, Ser. No. 707,196
Int. Cl. B62d 21/00
U.S. Cl. 280—106                                    13 Claims

ABSTRACT OF THE DISCLOSURE

A frame structure for the chassis of a motor vehicle having a construction designed and to dissipate energy by deformation of frame components. The frame has front side rails each of which comprises a pair of girder members that have their rearward ends welded together and their forward ends split apart in a diverging fashion. A frame cross member is situated directly behind the vehicle bumper and is rigidly connected to one of the girder members of each of the side rails. The contour of the frame side rails is such as to permit controlled collapse for energy absorption.

BACKGROUND OF THE INVENTION

The present invention relates to chassis frames for motor vehicles and more particularly to frames that are designed to absorb energy by the controlled collapse or deformation of frame components.

BRIEF SUMMARY OF THE INVENTION

The present invention is directed toward a collapsible frame structure for a motor vehicle that absorbs energy.

The present invention provides a frame structure having a pair of forward side rail members that are each formed by joining a pair of girder elements. The girders have their rearward ends welded together and their forward ends separated in a diverging fashion. A frame cross member is situated directly behind the vehicle bumper and is welded to one of the girder elements of each of the frame side rails.

In the preferred embodiment, the inner girder elements are welded to the cross member and the outer girders extend in a diverging direction with their ends overlapping the cross member.

This design achieves the following characteristics. The positioning of the forward cross member directly behind the bumper permits an unconventional increase in the length of the forward side rails. A rearwardly directed load upon the cross member that is above a preset minimum will cause the inner girder elements welded to it to buckle and to separate from the outer girders. The distortion of the girders and their separation provides a means for dissipating energy.

BRIEF DESCRIPTION OF THE DRAWINGS

The many objects and advantages of the present invention will become apparent upon consideration of the following discussion and the accompanying drawings, in which:

FIG. 1 is a perspective view of a motor vehicle frame constructed in accordance with the presently preferred embodiment of this invention;

FIG. 2 is a top plan view of a portion of the frame structure disclosed in FIG. 1;

FIG. 3 is a sectional view taken along section lines 3—3 of the bumper portion of the frame structure shown in FIG. 2;

FIG. 4 is a sectional view taken along section lines 4—4 of the bumper bracket of FIG. 3; and FIG. 5 is a sectional view taken along section lines 5—5 of the frame side rail of FIG. 2.

DETAILED DESCRIPTION OF THE INVENTION

Referring now to the drawings, wherein the presently preferred embodiment of the invention is illustrated, FIG. 1 discloses a novel frame assembly 10 for a motor vehicle. The assembly 10 includes left and right forward side rails 12 and 14. A forward cross member 16 interconnects the forward ends of the side rails 12 and 14. A second cross member 18 extends transversely between the side rails 12 and 14 at a distance spaced rearwardly of the first cross member 16.

The rear ends of the side rails 12 and 14 are welded to left and right torque boxes 20 and 22, respectively. The torque boxes 20, 22 extend laterally from the ends of the forward side rails 12 and 14 and are welded to the forward ends of intermediate side rails 24 and 26.

The remainder of the frame assembly 10, including the undisclosed portion of the intermediate side rails 24, 26 is of conventional construction. The vehicle body which accommodates the vehicle passengers and driver is supported principally on the intermediate side rail members 24 and 26.

The frame assembly 10 provides support for various components of the vehicle. The second cross member 18 has engine mounting means for supporting the vehicle power plant. The cross member 18 also supports the wheel suspension system, a portion of which is shown in FIGS. 1 and 2. Left and right suspension arms 28 and 30 have their inner ends pivotally connected to the second cross member 18 and their outer ends joined to wheel support members by a ball joint (not shown). The arms 28 and 30 are braced in a longitudinal direction by diagonally arranged drag struts 31 and 32. The rear ends of the struts 31, 32 are connected to the suspension arms and their forward ends are secured to supporting brackets 33 and 34 affixed to the left and right side rails 12, 14. Left and right coil springs 35 and 38 support the frame assembly 10 upon the arms 28 and 30 and upon the wheels to which the suspension arms are connected.

An anti-roll bar 40 has its left end connected to the left arm 28 by a link 42. The anti-roll bar 40 is similarly connected tot he right suspension arm 30. The bar 40 is journalled on the frame assembly 10 by means such as the bracket 42 secured to the left side at rail 12 as seen in FIG. 2.

The forward side rails 12, 14 have a unique construction as illustrated in the drawings. FIG. 2 illustrates the frame construction for the left front side in detail; the construction on the right side is similar.

The left side rail 12 is formed by joining a pair of girder elements 46 and 48, each having a hat-shaped cross section as seen in FIG. 5. The flanged edges of the girders 46, 48 are positioned in a side-by-side relationship and welded together so as to form a side rail having a box-shaped cross sectional configuration.

The inner girder 48 extends longitudinally forwardly from the second cross member 18 to approximately its midpoint where it angles inwardly and terminates with a transverse end portion 50. Portion 50 is rigidly welded to the first cross member 16. The outer girder 46 extends longitudinally for approximately half of its length and then sweeps outwardly to a transverse end portion 52 that overlaps the cross frame member 16. In one embodiment of the invention, the end 52 is in contact with the frame cross member 16 but is not welded to it.

Referring to FIG. 1, it will be noted that the forward portion of the right-hand side rail 14 is similarly formed with inner and outer girder elements 54 and 56. The inner girder 54 and the outer girder 56 are welded together along their rearward portion to form a box-shaped cross section. The inner girder 54 is splayed inwardly and is welded to the cross member 16 with its end juxtaposed end 50 of girder 48. The outer girder 56 sweeps outwardly and overlaps the cross member 16 at its right-hand end.

Spaced apart brackets 58 and 60 are connected to the forward cross member 16 and provide a support for the vehicle bumper 62. The detailed construction of the bracket assemblies 58 and 60 is disclosed in FIGS. 3 and 4. Each bracket assembly includes lower and upper bracket members 64 and 66 that are connected to a channel-shaped support member 68 by means of intermediate rubber layers 70 and 72. A bolt 74 secures the channel member 68 to the frame cross member 16 and bolts 76 secure the bumper 62 to the bracket members 64 and 66.

It is to be noted that the cross member 16 is closely spaced with respect to the bumper 62. This contrasts with some constructions in which the forward cross member is located some distance from the bumper and the bumper is supported on that frame member by a plurality of rather long cantilever support members. As seen in FIG. 3, the bumper brackets are shorter as compared with such construction.

OPERATION

In the event a load above a preset valve is imposed upon the bumper 62, it will be forced against the forward cross member 16. With a further application of a force upon the bumper 62 forward cross member 16 will be forced rearwardly toward the second cross member 18. As this movement occurs, the inner girder members 48 and 54 will buckle in the area between their attachments to the cross member 16 and to the outer girder elements 46 and 56. In conjunction with the buckling of the inner girder elements 48 and 54, the outer girder elements 46 and 56 will also be deformed. This deformation of frame components results in the absorption of energy.

In one preferred embodiment of the invention, the ends of the outer girder elements 46, 56 are not welded to the cross member 16 in order to permit them to bend and buckle. As the cross member 16 moves toward the cross member 18, the outer ends of the girders 46, 56 will slide outwardly along the cross member 16. If the force is of sufficient magnitude to displace the cross member 16 rearwardly to the location where the inner and outer girder elements are welded together to form the box-shaped rails, then the seams connecting the girders will separate and peel apart. The manner in which the outer girder 46 will be peeled away from the inner girder member 48 is comparable to the removal of a segment of a banana skin. This also results in energy absorption.

The frame assembly 10 is of rigid construction to permit its normal function of supporting the vehicle body. It is, however, of such a unique design as to permit progressive energy absorption. As the inner girder 48 buckles and the outer girder 46 bends, the energy present upon impact is dissipated. The continuing distortion of these frame members and their separation at the weld seam continues the dissipation of energy. The collapse of the frame structure is gradual.

The foregoing description presents the presently preferred embodiment of this invention. Modifications and alterations may occur to those skilled in the art that will come within the scope and spirit of the following claims.

We claim:

1. An energy absorbing frame structure for a motor vehicle, said frame structure being constructed to support a vehicle body, said frame structure comprising a pair of left and right forward side rails each having portions extending in a generally longitudinal direction, each of said side rails comprising inner and outer girder elements having their rearward ends rigidly secured together, the forward ends of said girder elements being splayed apart in a diverging fashion, said inner girder elements extending forwardly and inwardly, said outer girder elements extending forwardly and outwardly, a forward frame cross member rigidly secured to the forward end of at least two of said girder elements, said inner and outer girder elements being constructed to collapse and separate during a frontal impact above a preset force level upon said forward frame cross member.

2. An energy absorbing frame structure according to claim 1 and including:
the forward ends of said outer girder members being situated laterally outwardly of said longitudinal portions of said forward side rails.

3. An energy absorbing frame structure according to claim 1 and including:
said inner and outer girder members having forward end portions extending generally parallel to the adjacent portions of said forward cross frame members.

4. An energy absorbing frame structure according to claim 1 and including:
a second frame cross member interconnecting said side rails, wheel suspension support means connected to said frame structure adjacent said second frame cross member, said inner girder elements having their forward ends welded to said forward frame cross member, said outer girder elements having their forward ends overlapping said first frame cross member.

5. An energy absorbing frame structure according to claim 1 and including:
said inner girder elements having their forward ends welded to said forward frame cross member, the ends of said forward cross member extending laterally outwardly of the longitudinal portions of said side rails.

6. An energy absorbing frame structure according to claim 1 and including:
the ends of said forward cross member extending laterally outwardly of the longitudinal portions of said side rails, means connecting a vehicle bumper to said forward frame cross member, said bumper being closely spaced with respect to said forward frame cross member.

7. An energy absorbing frame structure according to claim 1 and including:
a second frame cross member interconnecting said side rails, wheel suspension support means connected to said frame structure adjacent said second frame cross member, said forward cross member being of greater length than said second cross member.

8. An energy absorbing frame structure according to claim 1 and including:
a second frame cross member interconnecting said side rails, wheel suspension support means connected to said frame structure adjacent said second frame cross member, said forward cross member being of greater length than said second cross member, means connecting a vehicle bumper to said forward frame cross member, said bumper being closely spaced with respect to said forward frame cross member.

9. An energy absorbing frame structure according to claim 1 and including:
forwardly and outwardly, said inner girder elements having their forward ends welded to said forward frame cross member, said outer girder elements having their forward ends overlapping said forward frame cross member, the ends of said forward cross member extending laterally outwardly of the longitudinal portions of said side rails, spaced apart resilient means connecting a vehicle bumper to said forward frame cross member, said bumper being closely spaced with respect to said forward frame cross member.

10. An energy absorbing frame structure according to claim 1 and including:
said inner girder elements extending forwardly and inwardly, said outer girder elements extending forwardly and outwardly.

11. An energy absorbing frame structure according to claim 1 and including:

a second frame cross member interconnecting said side rails, wheel suspension support means connected to said frame structure adjacent said second frame cross member.

12. An energy absorbing frame structure according to claim 11 and including:

the forward ends of said outer girder members being situated laterally outwardly of the outer ends of said second frame cross member.

13. An energy absorbing frame structure for a motor vehicle, said frame structure constructed to support a vehicle body, said frame structure comprising a pair of left and right forward side rails each having portions extending in a generally longitudinal direction, each of said side rails comprising inner and outer girder elements having their rearward ends rigidly secured together, the forward ends of said girder elements being splayed apart in a diverging fashion, a forward frame cross member, said inner girder elements having their forward ends welded to said forward frame cross member, said outer girder elements having their forward ends overlapping said first frame cross member, said inner and outer girder elements being constructed to collapse and separate during a frontal impact above a preset force level upon said forward frame cross member, a second frame cross member interconnecting said side rails, wheel suspension support means connected to said frame structure adjacent said second frame cross member, said forward cross member being of greater length than said second cross member, the ends of said forward cross member extending laterally outwardly of the longitudinal portions of said side rails, spaced apart resilient means connecting a vehicle bumper to said forward frame cross member, said bumper being closely spaced with respect to said forward frame cross member.

References Cited

UNITED STATES PATENTS

| | | | |
|---|---|---|---|
| 2,335,546 | 11/1943 | Sladky | 280—106 |
| 2,627,426 | 2/1953 | Toncray | 280—106 |
| 2,835,506 | 5/1958 | Schilberg | 280—106 |
| 3,129,954 | 4/1964 | Duero | 280—106 |
| 3,264,010 | 8/1966 | Pierce | 280—106 |

PHILIP GOODMAN, Primary Examiner